(12) United States Patent
Salasin et al.

(10) Patent No.: US 12,070,900 B2
(45) Date of Patent: *Aug. 27, 2024

(54) PHOTON PROPAGATION MODIFIED ADDITIVE MANUFACTURING COMPOSITIONS AND METHODS OF ADDITIVE MANUFACTURING USING SAME

(71) Applicant: BWXT Advanced Technologies LLC, Lynchburg, VA (US)

(72) Inventors: John R. Salasin, Lynchburg, VA (US); Benjamin D. Fisher, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,667

(22) Filed: Jul. 3, 2023

(65) Prior Publication Data
US 2023/0339175 A1 Oct. 26, 2023

Related U.S. Application Data

(62) Division of application No. 17/515,625, filed on Nov. 1, 2021, now Pat. No. 11,731,350.
(Continued)

(51) Int. Cl.
*B29C 64/00* (2017.01)
*B29C 64/165* (2017.01)
(Continued)

(52) U.S. Cl.
CPC ............ *B29C 64/165* (2017.08); *B33Y 10/00* (2014.12); *B33Y 70/10* (2020.01); *B33Y 80/00* (2014.12);
(Continued)

(58) Field of Classification Search
CPC .............................. B29C 64/165; B33Y 10/00
See application file for complete search history.

(56) References Cited

U.S. PATENT DOCUMENTS 4,016,226 A 4/1977 Kosiancic
9,217,098 B1 12/2015 Stevenson et al.
(Continued)

OTHER PUBLICATIONS

International Search Report and Written Opinion dated Feb. 15, 2022, issued in corresponding International Application No. PCT/US2021/057644.
(Continued)

*Primary Examiner* — Nicholas R Krasnow
(74) *Attorney, Agent, or Firm* — Morgan, Lewis & Bockius LLP

(57) ABSTRACT

Additive manufacturing compositions include low-absorbing particles or non-absorbing particles that have an absorbance for wavelengths of 300 nm to 700 nm that is equal to or greater than 0 Au and is less 1.0 Au, such as 0.001 Au≤absorbance≤0.7 Au. Slurries including such particles and an uranium-containing particle and that are used in additive manufacturing processes have an increased penetration depth for curative radiation. Removal of low-absorbing particles or non-absorbing particles during post-processing of as-manufactured products results in pores that create porosity in the as-manufactured product that provide a volume accommodating fission gases and/or can enhance wicking of certain heat pipe coolant liquids. Low-absorbing particles or non-absorbing particles can be functionalized for improved properties, for example, with fissionable material for improved ceramic yields, with burnable poisons or stabilizers for increased homogeneity, with stabilizers for localized delivery of the stabilizer, or with combinations thereof.

25 Claims, 7 Drawing Sheets

Related U.S. Application Data

(60) Provisional application No. 63/109,882, filed on Nov. 5, 2020.

(51) Int. Cl.

| | | |
|---|---|---|
| *B33Y 10/00* | (2015.01) | |
| *B33Y 70/10* | (2020.01) | |
| *B33Y 80/00* | (2015.01) | |
| *C08F 2/08* | (2006.01) | |
| *C08F 2/46* | (2006.01) | |
| *C08F 22/10* | (2006.01) | |
| *C08K 3/08* | (2006.01) | |
| *C08K 3/22* | (2006.01) | |
| *G21C 3/50* | (2006.01) | |

(52) U.S. Cl.
CPC ............... *C08F 2/08* (2013.01); *C08F 2/46* (2013.01); *C08F 22/1006* (2020.02); *C08K 3/08* (2013.01); *C08K 3/22* (2013.01); *G21C 3/50* (2013.01); *C08K 2003/0856* (2013.01); *C08K 2201/003* (2013.01)

(56) References Cited

U.S. PATENT DOCUMENTS

| | | |
|---|---|---|
| 10,737,984 B2 | 8/2020 | Schaedler et al. |
| 10,993,783 B2 | 5/2021 | Wu et al. |
| 11,177,047 B2 | 11/2021 | van Rooyen et al. |
| 2004/0094058 A1 | 5/2004 | Kasperchik et al. |
| 2004/0265413 A1 | 12/2004 | Russell et al. |
| 2011/0190446 A1 | 8/2011 | Matsui et al. |
| 2013/0010914 A1 | 1/2013 | Garnier et al. |
| 2014/0113844 A1 | 4/2014 | Haque et al. |
| 2014/0197557 A1 | 7/2014 | Picart et al. |
| 2017/0021455 A1 | 1/2017 | Dallarosa et al. |
| 2017/0196666 A1 | 7/2017 | Bohm et al. |
| 2017/0287575 A1 | 10/2017 | Venneri |
| 2017/0326789 A1 | 11/2017 | Kimblad et al. |
| 2018/0148379 A1 | 5/2018 | Schaedler et al. |
| 2018/0326480 A1 | 11/2018 | Opschoor et al. |
| 2020/0070242 A1 | 3/2020 | Opschoor et al. |
| 2020/0308064 A1 | 10/2020 | Fisher et al. |
| 2020/0353681 A1 | 11/2020 | Fisher et al. |
| 2020/0373024 A1 | 11/2020 | Gramlich |
| 2021/0158978 A1 | 5/2021 | Terrani et al. |
| 2021/0202115 A1 | 7/2021 | Na et al. |
| 2021/0202116 A1 | 7/2021 | Griffith et al. |
| 2021/0230072 A1 | 7/2021 | Dickerson et al. |
| 2021/0304909 A1 | 9/2021 | Gramlich et al. |
| 2021/0358645 A1 | 11/2021 | Kim et al. |

OTHER PUBLICATIONS

Wang et al., Point Defects in Ce-doped Y3Al5O12 crystal scintillators, Phys. Rev. B 73, 233204, Jun. 16, 2006. (Abstract only).
Hargreaves, Porosity of nuclear fuels. Nature 329, 589 (1987). https://doi.org/10.1038/329589c0.
Thomas, et al., Permeability of observed three dimensional fracture networks in spent fuel pins, Journal of Nuclear Materials 510 (2018) 613-622.
Ondracek et al., The Porosity Dependence of the Thermal Conductivity for Nuclear Fuels, Journal of Nuclear Materials 46 (1973) 253-258.
Blanchard et al., Uranium Oxide Aerosol Transport in Porous Graphite, Report PNNL-21014 (Jan. 2012) (90 pages).
Yao et al., Grain growth and pore coarsening in dense nanocrystalline UO2+x fuel pellets. United States (2017). https://doi.org/10.1111/jace.14780.
Ivanov, The model of the fission gas release out of porous fuel, Annals of Nuclear Energy, vol. 25, Issue 15, Sep. 1998, pp. 1275-1280.
Aravindan et al., Yield behavior of porous nuclear fuel (UO2), Mechanics of Advanced Materials and Structures, 23:10, (2016) 1149-1162, DOI: 10.1080/15376494.2015.1059529.
Torrent et al., Diffuse Reflectance Spectroscopy, in Methods of Soil Analysis Part 5—Mineralogical Methods, Eds. A. Ulery et al., No. 5 in the Soil Science Society of America Book Series, Madison, Wisconsin: Soil Science Society of America, Inc. (2008), pp. 367-385.
International Preliminary Report on Patentability dated May 19, 2023, issued in corresponding International Patent Application No. PCT/US2021/057644.
Extended European Search Report dated Apr. 22, 2024, issued in corresponding European Patent Application No. 21889892.2.

PHOTON PROPAGATION MODIFIED ADDITIVE MANUFACTURING COMPOSITIONS AND METHODS OF ADDITIVE MANUFACTURING USING SAME

RELATED APPLICATION DATA

This application is a divisional application of U.S. patent application Ser. No. 17/515,625, filed Nov. 1, 2021, which is based on and claims priority under 35 U.S.C. § 119 to U.S. Provisional Application No. 63/109,882, filed Nov. 5, 2020, the entire contents of which are incorporated herein by reference.

TECHNICAL FIELD AND INDUSTRIAL APPLICABILITY

The disclosure relates generally to compositions used in additive manufacturing and methods of additive manufacturing. In particular, the disclosed additive manufacturing compositions include particles having low- or non-absorbing properties in combination with particles having high-absorbing properties. In one aspect, because of reduced absorption of curative radiation wavelengths due to the presence of particles having low- to non-absorbing properties, the curative radiation has an increased penetration depth into the slurry used in additive manufacturing processes. In another aspect, the included low- or non-absorbing particles have absorbance properties that are less than that for high-absorbing properties, such as uranium-containing particles. In still another aspect, the low- to non-absorbing particles are present in additive manufacturing compositions during an additive manufacturing process, such as in the printing phase, but are removed during post-processing of the as-manufactured product, resulting in pores that create a porosity in the as-manufactured product. In fission reactor applications, the pores and resulting porosity provide a volume that accommodates fission gases and/or enhances transport, such as by wicking, of certain heat pipe coolant liquids. In further aspects, the low- to non-absorbing particles can be functionalized for improved properties, for example, functionalized with fissionable material for improved ceramic yields; functionalized with burnable poisons, moderators, or stabilizers for increased homogeneity; functionalized with stabilizers for localized delivery of the stabilizer; or functionalized with combinations thereof for a combination of improved properties.

Slurries containing low- to non-absorbing particles in combination with particles having high-absorbing properties can be incorporated into an additive manufacturing protocol of an additive manufacturing process for manufacturing a component. Such slurries can be used with suitable high-absorbing materials, such as fuel assembly structure materials (e.g., Ni, W, Mo or N—W—Mo alloys), moderator materials (e.g., graphite, boron, or carbon-based materials), and nuclear fuel slurry materials (e.g., uranium or uranium-molybdenum based materials), to additively manufacture a semi-finished or finished component, such as a component for use in a nuclear reactor. In the nuclear reactor component context, the slurries include 10 vol. % to 20 vol. % of low- to non-absorbing particles and 30 vol. % to 40 vol. % of particles having a composition including uranium-containing material, such as uranium metal, uranium metal alloy, uranium ceramic, or uranium-molybdenum alloy.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Various processes can be used by which material is joined or solidified under computer control to create a three-dimensional object, for example, by adding material together (such as curing liquid molecules or fusing powder grains). There are many different technologies, based on melting/depositing technologies or on deposition/curing technologies, and these technologies can be used to manufacture objects of almost any shape or geometry using digital model data from, for example, a 3D model or another electronic data source such as a computer-aided design (CAD) model or an Additive Manufacturing File (AMF) (usually in sequential layers).

While there are a large number of these manufacturing processes available, the main differences between processes are in the way layers are deposited to create parts and in the materials that are used. Some methods melt or soften the material to produce the layers. Examples include fused filament fabrication (FFF), also known as fused deposition modeling (FDM), fused particle fabrication (FPF) or fused granular fabrication (FGF), which produces components by extruding small beads or streams of material that harden immediately to form layers. Other methods cure liquid-based materials using different technologies, each of which solidifies one or more constituents present in the liquid material in a layer-by-layer approach to build up the manufactured object. Examples include stereolithography (SL) utilizing various optical- or chemical-based curing processes (with associated opto-reactive or chemi-reactive materials). In each instance, the manufactured product has properties based on the material of manufacture.

In additive manufacturing utilizing optical- or chemical-based curing processes with a photo-initiated process, radiation enters the liquid materials and a) is transmitted through the polymer phase(s), b) is transmitted and refracted through the particulate phase(s), c) is absorbed by the photo-initiating component(s), or d) is absorbed by the particulate phase(s). Absorption by the particulate phase(s) prevents polymerization of the liquid materials through the extinction of curative radiation. However, if the particulate phase(s) have high absorption properties (for the particular radiation used in the process)—such as uranium-containing material—absorption by the particulate phase(s) increases and transmittance and refraction decreases, which results in a decrease in the cure depth, i.e., the thickness of the liquid material that is cured to form a layer. A decrease in cure depth leads to a decrease in thickness deposited in each sequential layer by the additive manufacturing process, which decreases efficiency. In some instances, the decrease in cure depth can prevent adequate curing at all, meaning one is unable to deposit from such liquid material compositions using the additive manufacturing process, e.g., are "unprintable". While some of the decrease in cure depth can be ameliorated by decreasing the concentration of particulate phase(s), such a decrease in concentration of particulate phase(s) has a negative effect on the rheology of the liquid material and on the success of post-printing processes (i.e. sintering to full density).

SUMMARY

Considering the above, it would desirable to increase the penetration depth of curative radiation, in particular curative radiation in the 300 nm to 700 nm range, into liquid materials (also called herein a slurry), in particular when the liquid materials include constituents with a high absorbance for the curative radiation, such as uranium-containing material. At the same time, it would be desirable to minimally decrease, alternatively not decrease, the concentration of particulate phase(s), so as to maintain suitable rheology of the liquid material for use in additive manufacturing processes, particularly in stereolithography.

In general, the disclosure relates to compositions used in additive manufacturing and methods of additive manufacturing based on deposition/curing techniques. More specifically, the disclosure relates to compositions and processes applicable to deposition/curing additive manufacturing techniques, in particular stereolithography. The composition of the slurry includes a high absorbance component, e.g., a uranium-containing particles, and a low- or non-absorbance component, e.g., particles with absorbance values less than that for the high absorbance component under the same conditions. In each of the high absorbance component and low- or non-absorbance component, absorbance is in relation to the curative radiation used in the additive manufacturing process, such as curative radiation between 300 nm and 700 nm, alternatively 400 nm to 600 nm or, e.g., 390 nm to 415 nm or 490 nm to 510 nm or 600 to 620 nm.

Absorbance relates to the amount of light reflected or scattered by a sample or by the amount transmitted through a sample. If all light passes through a sample, none was absorbed, so the absorbance would be zero and the transmission would be 100%. On the other hand, if no light passes through a sample, the absorbance is infinite and the percent transmission is zero. Absorbance, such as absorbance to curative radiation, is expressed in "absorbance units," which has the abbreviation Au and is dimensionless, and is reported on a logarithmic scale. Thus, 0 Au is equal to 0% absorbance (100% transmittance), 1.0 Au is equal to 90% absorbance (10% transmittance), 2.0 Au is equal to 99% absorbance (1% transmittance), 3.0 Au is equal to 99.9% absorbance (0.1% transmittance), and so on in a logarithmic trend.

As used herein, absorbance (A) was determined by diffuse reflectance spectrometry using a Shimadzu 2600/2700i UV/Vis Shimadzu 2600/2700i UV/Vis Spectrometer with an integrating sphere attachment. The spectrometer was used to measure diffuse reflectance of powder samples. Correct system initialization and background data collections were performed per the manual. Samples were loaded into quartz sample containers and pressure was applied to obtain a uniform surface. Measurement was performed in diffuse reflectance mode and collected over the range of interest, i.e., 185 to 1400 nm. The reflectance pattern was then evaluated through the Kubelka-Munk transformation within the software of the spectrometer. The output was absorbance vs. wavelength for the range of evaluation. The output was then used in a relative comparison with other materials of interest to classify a material's absorbance relative to that for a uranium-containing material. Other details and aspects of diffuse reflectance spectrometry are disclosed in J. Torrent et al., "Diffuse Reflectance Spectroscopy," in Methods of Soil Analysis Part 5—Mineralogical Methods, Eds. A. Ulery et al., Number 5 in the Soil Science Society of America Book Series, Madison, Wisconsin: Soil Science Society of America, Inc. (2008), pp. 367-385, the entire contents of which are incorporated herein by reference, which describes available laboratory methods for recording diffuse reflectance spectra that can be readily adapted and applied to the powder samples of the first particulate phase and powder samples of the second particulate phase and that were used in the liquid materials disclosed herein. It should be noted that dilution of samples was not utilized when performing diffuse reflectance spectrometry on the materials disclosed herein.

Particles with lower absorbance allow the curative radiation to penetrate a greater distance into the slurry, a characteristic that allows for increased cure depth, a thicker deposited layer, a higher loading of ceramic material (such as $UO_2$) in the slurry, or a combination thereof. Such particles are non-reactive with the remainder of the materials of the slurry and, after curing, the particles can be removed during post-manufacturing processing, such as by hydrolysis or thermal decomposition.

As used herein, "non-absorbance particles" have absorbance that is equal to 0 Au and, as used herein, "low-absorbance particles" have absorbance to curative radiation that is greater than zero and that is also lower than the absorbance to the curative radiation of a uranium-containing particle, i.e.:

$$0 \quad Au < Absorbance_{low\text{-}absorbance\ particle} < Absorbance_{uranium\text{-}containing\ particle}.$$

In some embodiments, absorbance to the curative radiation of a uranium-containing particle is from 1 Au to 3 Au and the low-absorbance particles have absorbance to the curative radiation that ranges from equal to or greater than 0.001 Au to equal to or less than absorbance to the curative radiation of the uranium-containing particle:

$$0.001 \quad Au < Absorbance_{low\text{-}absorbance\ particle} < Absorbance_{uranium\text{-}containing\ particle}.$$

In some embodiments, the low-absorbance particles have absorbance to the curative radiation that is less than 1.0 Au, for example, absorbance to the curative radiation that ranges from equal to or greater than 0.001 Au or 0.01 Au or 0.1 Au to equal to or less than 0.7 Au or 0.6 Au or 0.5 Au. In one particular embodiment, the low-absorbance particles have absorbance to the curative radiation that ranges from equal to or greater than 0.001 Au to equal to or less than 0.26 Au.

As used herein, the curative radiation refers to the wavelengths of radiation used for curing the resin of slurry. The wavelengths of radiation used for curing the resin of slurry will vary based on the composition of the slurry. However, in example embodiments, the curative radiation has wavelengths of 300 nm to 700 nm, alternatively from 390 nm to 415 nm or from 490 nm to 510 nm or from 600 nm to 620 nm. In specific examples, the curative radiation has a wavelength of 405 nm or 500 nm or 618 nm.

Because of the sequential, layer-by-layer manufacturing process, the disclosed additive manufacturing process is suitable for manufacture of complex components. In the nuclear reactor component context, examples of complex components include fuel assemblies (e.g., arrangements of fuel elements (which contain the fuel and burnable poisons), mechanical support for the fuel assembly structure, spacer grids (which ensure a spacing of components and guiding of the fuel elements), and non-fuel tubes for, e.g., control rods or in-core instrumentation and the like) (also known as fuel bundles). Complexity of structure extends to other systems in a nuclear reactor, including the various components of the primary cycle (meaning those systems subject to, in contact with or otherwise exposed to the primary coolant), such as, depending on design, tubing, pumps, instrumentation, heat exchangers, and steam generators.

The use of the disclosed methods of additive manufacturing has been found to be advantageous to the manufacture of these complex structures, in particular the fuel element and fuel assembly, and improves both the manufacturing process itself as well as the manufactured complex structure, including the quality assurance of such structures. The use of the disclosed methods of additive manufacturing coupled with the disclosed compositions has been found to be particularly advantageous for these ends.

Embodiments disclosed herein include methods for additive manufacturing a component, particular a component of a fission reactor, as well as compositions of slurries to be used in additive manufacturing of such components, both during additive manufacturing process development and prototype development, as well as in final manufacture of in-service parts.

Embodiments of a method for manufacturing a component of a nuclear reactor system comprises using a slurry containing low- to non-absorbing particles in an additive manufacturing protocol, and manufacturing a green body of a component of a nuclear reactor system using the slurry in the additive manufacturing protocol in an additive manufacturing process.

Embodiments of a slurry for additive manufacturing have a composition comprising (in vol. % relative to total volume of the powders): 30 vol. % to 40 vol. % of a plurality of first particles; 10 vol. % to 20 vol. % of a plurality of second particles; >0 vol. % to 5 vol. % of a dispersant' greater than 0 vol. % of a photoabsorber; greater than 0 vol. % of a photoinitiator; and 25 vol. % to <45 vol. % of at least one monomer resin as a balance, wherein a total amount of plurality of first particles and plurality of second particles is maximum 60 vol. %. The first particles have a composition including a uranium-containing material. The second particles have an absorbance for wavelengths of 300 nm to 700 nm that is equal to or greater than 0 Au and less than 1.0 Au, alternatively, that is equal to or greater than 0.001 Au or 0.01 Au or 0.1 Au to equal to or less than 0.7 Au or 0.6 Au or 0.5 Au. The photoabsorber and photoinitiator operate within an incident wavelength of 300 nm to 700 nm.

Embodiments of a method for manufacturing a component of a nuclear reactor system comprises using an additive manufacturing protocol with a nuclear fuel slurry to manufacture a green body of a component of a nuclear reactor system, wherein the nuclear fuel slurry has a composition comprising (in vol. % relative to total volume of the slurry): 30 vol. % to 40 vol. % of a plurality of first particles; 10 vol. % to 20 vol. % of a plurality of second particles; >0 vol. % to 5 vol. % of a dispersant' greater than 0 vol. % of a photoabsorber; greater than 0 vol. % of a photoinitiator; and 25 vol. % to <45 vol. % of at least one monomer resin as a balance, wherein a total amount of plurality of first particles and plurality of second particles is maximum 60 vol. %. The first particles have a composition including a uranium-containing material. The second particles have an absorbance for wavelengths of 300 nm to 700 nm that is equal to or greater than 0 Au and less than 1.0 Au, alternatively, that is equal to or greater than 0.001 Au or 0.01 Au or 0.1 Au to equal to or less than 0.7 Au or 0.6 Au or 0.5 Au. The photoabsorber and photoinitiator operate within an incident wavelength of 300 nm to 700 nm.

In some embodiments of the slurry and the method, the uranium-containing material is a uranium metal, a uranium metal alloy, a uranium ceramic, a uranium-molybdenum alloy, or mixtures thereof. In some embodiments, the uranium-containing material is a uranium oxide, a uranium dioxide, a uranium carbide, a uranium oxycarbide, a uranium nitride, a uranium silicide, a uranium fluoride, a uranium chloride, a cermet of uranium oxide and tungsten, a cermet of uranium dioxide and tungsten, a cermet of uranium oxide and molybdenum, a cermet of uranium dioxide and molybdenum, or mixtures thereof. However, other uranium-containing material can be used, including those containing inorganic species and those containing organic ligand/anionic species.

In one particular embodiment, the nuclear fuel slurry for additive manufacturing has a composition comprising: 30 vol. % to 45 vol. % of an acrylate-based monomer resin, 30 vol. % to 40 vol. % of a plurality of particles having a composition including a uranium-containing material, 10 vol. % to 20 vol. % of a plurality of particles having an absorbance for wavelengths of 300 nm to 700 nm that is equal to or greater than 0 Au and less than 1.0 Au, alternatively, that is equal to or greater than 0.001 Au or 0.01 Au or 0.1 Au to equal to or less than 0.7 Au or 0.6 Au or 0.5 Au, >0 vol. % to 7 vol. % of a dispersant suitable to disperse the plurality of particles in the nuclear fuel slurry, greater than 0 vol. % of a photoactivated dye for subsequent activation during quality control inspection, greater than 0 vol. % of a photoabsorber stops the free-radicalization polymerization of the slurry and thereby reduces cross-linking and greater than 0 vol. % of a photoinitiator selected to match the wavelength of radiation that will be used to cure the slurry composition, or vice versa, and 0 vol. % to 18 vol. % (as a balance) of a methylnaphthalene as a diluent.

An additive manufacturing protocol, such as a stereolithographic additive manufacturing protocol, can be developed using a surrogate slurry (as disclosed in U.S. application Ser. No. 16/835,370 filed Mar. 31, 2020, the entire contents of which are incorporated herein by reference), which has been modified to incorporate the low absorption cross-section particles.

Although the disclosed reactor and core have components with complex mechanical geometries, integral and iterative manufacturing including the fissionable fuel material enables the components to be more easily manufactured.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

DETAILED DESCRIPTION

Figure 1:
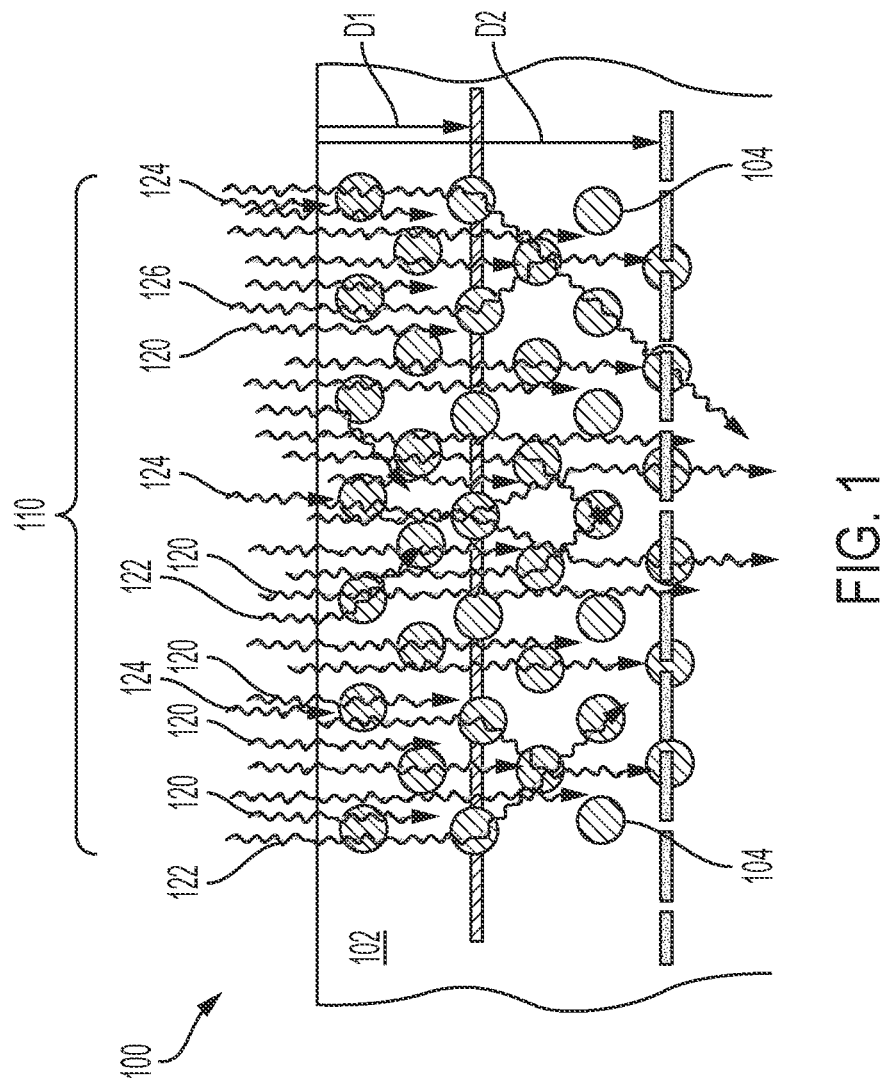
FIG. 1 schematically illustrates these various processes that occur when curative radiation interacts with the slurry consisting of a plurality of non- or low-absorbing particles.

Slurries for additive manufacturing based on deposition/curing techniques include, in general, a monomer phase (typically including one or more monomer resins), a particulate phase (typically including ceramic materials), a dispersant (to facilitate the distribution of the particulate phase in the polymer phase), a photoinitiator (to interact with the curative radiation and initiate radical polymerization of the monomer phase), and a photoabsorber (to absorb the incident radiation within certain wavelengths and stop or reduce the free-radicalization polymerization of the slurry resulting from those wavelengths and thereby reduces crosslinking). In additive manufacturing based on deposition/curing techniques, when curative radiation interacts with the slurry, the curative radiation can either (i) be transmitted through the monomer phase of the slurry, (ii) be transmitted and refracted through the particulate phase of the slurry, (iii) be absorbed by the photoinitiator or photoabsorber of the slurry, or (iv) be absorbed by the particulate phases present in the slurry. FIG. 1 schematically illustrates these various processes that occur when curative radiation interacts with the slurry. In FIG. 1, a volume of a slurry 100, which is a solution with a monomer phase 102 and a particulate phase 104. In FIG. 1, the particles in the particulate phase have an absorbance to the incident curative radiation that is equal to or greater than 0 Au and less than 1.0 Au, alternatively, that is equal to or greater than 0.001 Au or 0.01 Au or 0.1 Au to equal to or less than 0.7 Au or 0.6 Au or 0.5 Au. Examples particles for the particulate phase include cerium oxide ($CeO_2$), but other particles can be used as or included in the particulate phase, such as zirconium dioxide ($ZrO_2$), beryllium oxide (BeO), and polyamide). The dispersant, photoinitiator, and photoabsorber are dissolved or mixed in the monomer phase 102 and are not shown in FIG. 1. When curative radiation 110 (such as radiation having a wavelength in the range of 300 nm to 700 nm or ultraviolet (UV) radiation; in specific examples, curative radiation of 405 nm or of 500 nm or of 618 nm) is incident on the slurry 100, several different phenomena can occur. For example, a first portion 120 of the curative radiation 110 is transmitted through the monomer phase 102 and penetrates the slurry 100. Also for example, a second portion 122 of the curative radiation 110 is transmitted through and refracted by the particulate phase 104 of the slurry 100. Refraction occurs when the incident radiation interacts with a particle of the particulate phase 104 and changes direction and/or wavelength. Additional examples include a third portion 124 of the curative radiation 110 that is absorbed by the particulate phase 104 present in the slurry 100. In some instances, combinations of these effects can occur, in which case, the curative radiation 110 can be transmitted and refracted one or more times (for each phenomenon) before being absorbed by the monomer phase 102. Examples of curative radiation 110 incident on the slurry 100 and undergoing multiple transmissions and/or refractions are illustrated in FIG. 1 (see, e.g., incident radiation 126). A fourth portion of the curative radiation 110 is absorbed by the photoinitiator or photoabsorber of the slurry 100 (not shown in FIG. 1).

In the additive manufacturing process, a sufficient amount of curative radiation must penetrate the volume of the slurry 100 and be absorbed (either before or after refraction) by the monomer phase 102 present in the slurry 100 to initiate sufficient polymerization reactions to form an interconnected solid article. Thus, even though the curative radiation 110 may penetrate the slurry to a depth D2, the depth D1 at which sufficient curative radiation 110 penetrates the slurry 100 to initiate sufficient polymerization reactions in the monomer phase 102 to form an interconnected solid article is less than the depth D2. This difference arises mainly due to the reduction in available curative radiation 110 as a result of absorption events such as the third portion 124 of the curative radiation 110 that is absorbed by the particulate phase 104 present in the slurry 100. So while in FIG. 1 the depth D2 may be the penetration depth where 90% of the curative radiation 110 has been extinguished, depth D1 represents the printable depth and is the depth at which sufficient curative radiation 110 penetrates the slurry 100 to initiate sufficient polymerization reactions in the monomer phase 102 to form an interconnected solid article. In an example, a slurry containing $CeO_2$ particles with a 4 micron diameter and an incident curative radiation of 405 nm had a printable depth of about 30 microns.

Figure 2:
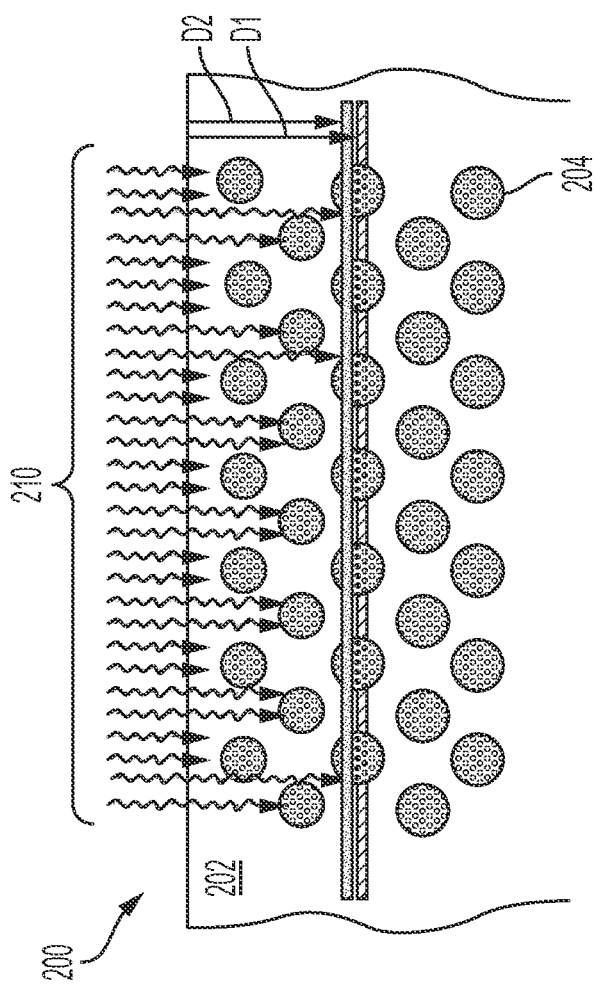
FIG. 2 schematically illustrates the curative radiation penetration into a slurry with a particulate phase of uranium dioxide in a monomer phase.

For a given particulate phase loading in the slurry (also called concentration), the penetration depth D2 and printable depth D1 varies based on the particulate phase having a higher or lower value for absorbance for a specified wavelength. For example, uranium dioxide ($UO_2$) is greater than 99% absorbing at 405 nm. Therefore, a slurry with a particulate phase consisting of $UO_2$ or a $UO_2$ compound results in essentially every photon from the curative radiation that interacts with the particulate phase being annihilated and less than 1% refraction and transmittance of the curative radiation through $UO_2$ is observed. FIG. 2 schematically illustrates the penetration of curative radiation into a slurry 200 with a particulate phase 204 of uranium dioxide in a monomer phase 202. The incident curative radiation 210 penetrates the monomer phase 202 of the slurry 200. Once the incident curative radiation 210 interacts with the particulate phase 204 of uranium dioxide, due to absorbance properties for uranium oxides, such as $UO_2$, of from 1.0 Au to 3.0 Au at a wavelength of 405 nm, greater than 90%, alternatively greater than 99% or greater than 99.9% of the incident curative radiation 210 is absorbed and refraction and/or transmittance of incident curative radiation 210 is de minimis (less than 1%). As a result, incident curative radiation 210 penetration into the slurry 200 is limited to only the path lengths where no interaction with particulate phase 204 occurs and, in effect, the penetration depth D2 and printable depth D1 are approximately (±3% to 5%) the same.

Considering the above observations, it was determined that to increase the penetration of the curative radiation into the slurry, one needs to increase the path lengths where no high absorbance particles, such as uranium dioxide, interactions occur.

In a first aspect, embodiments of the slurry composition and embodiments of the method of manufacturing using such slurry compositions increases the penetration depth D2 and the printable depth D1 by decreasing the loading of the particulate phase having high absorbance. The decreased loading of this particulate phase, such as of uranium dioxide, increases the spacing between the particulate phase. In these embodiments, it was found that a slurry with 50 vol. % particulate phase consisting of uranium oxide had a penetration depth D2 for curative radiation of 405 nm of about 9 microns, and a slurry with 25 vol. % particulate phase consisting of uranium oxide had a penetration depth D2 for curative radiation of 405 nm of about 20 microns. In general, for particulate phase consisting of uranium oxide between 25 vol. % and 50 vol. %, the light penetration depth D2 (microns) varied as a function of vol. % particulate phase consisting of uranium oxide. For example, following $I=I_0 e^{-\alpha z}$ (which is the relationship between intensity of transmitted light (I) at a given depth (z) as a function of the incident intensity ($I_0$) and the attenuation coefficient ($\alpha$)), the light penetration depth D2 (microns) varied linearly with respect to the log of intensity (I) or varied logarithmically with intensity (I). Additionally, for a loading of the particulate phase that forms a stable colloidal dispersion, it was found that decreasing the loading is a homogenous effect throughout the slurry.

Figure 3:
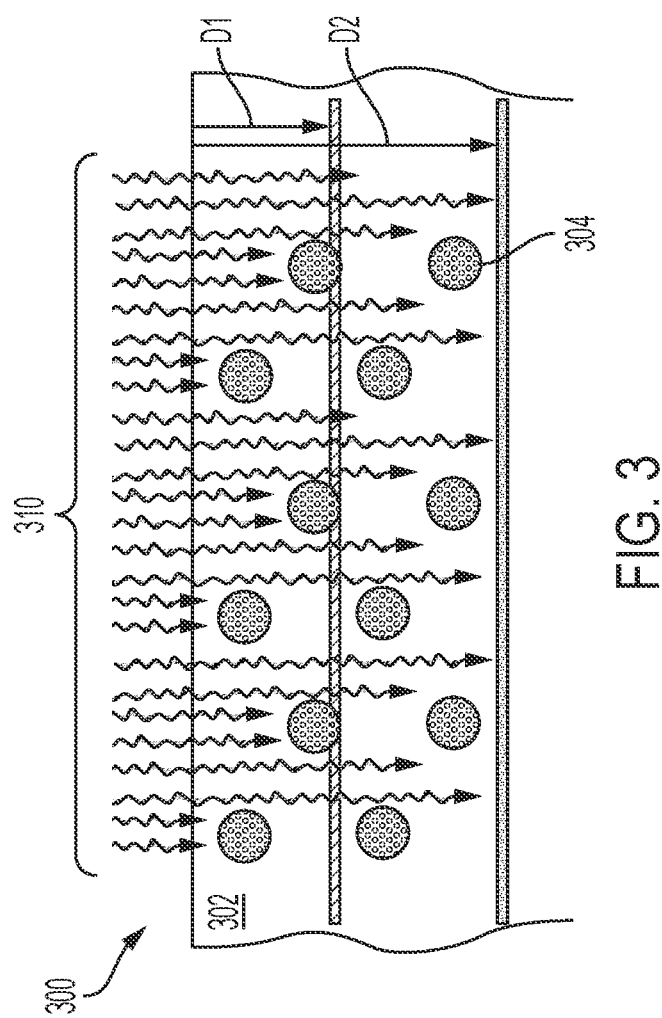
FIG. 3 schematically illustrates an embodiment in which the curative radiation penetration depth and the printable depth of the slurry are increased by decreasing the loading of the particulate phase in the slurry.

FIG. 3 schematically illustrates an embodiment in which the penetration depth D2 and the printable depth D1 of the slurry are increased by decreasing the loading of the high-absorbance particulate phase in the slurry. FIG. 3 schematically illustrates the penetration of curative radiation 310 into a slurry 300 with a particulate phase 304 of uranium dioxide in a monomer phase 302. Here, the volumetric loading of high-absorbance particulate phase 304 is approximately one-third of the volumetric loading depicted in FIG. 2. Following Mie theory, the absorption attenuation coefficient is directly proportional to volumetric loading. Therefore, because the volumetric loading is less in FIG. 3 as compared to FIG. 2, the light penetration depth D2 is increased as compared to that in FIG. 2. Additionally, by correlation, the cure depth is increased, which results in the printable depth D1 increasing as compared to that where the volumetric loading is higher, such as shown in FIG. 2.

Even though the cure depth and printable depth may be increased when the volumetric loading of high-absorbance particulate phase is decreased, there is a negative effect on achieving the desired microstructural product in sintering processes. Thus, while a decrease in volumetric loading increases feasibility of the greenbody additive manufacturing process, it also has a negative effect on post-process consolidation where a lack of densification, e.g., interconnected porosity resulting in densities <65% theoretical density (TD), and/or significant shrinkage will be observed, e.g., in the form of stress cracking due to geometric distortion during shrinkage.

In a second aspect, embodiments of the slurry composition and embodiments of the method of manufacturing using such slurry compositions increases the penetration depth D2 and the printable depth D1 by adding a second particulate phase with a lower absorbance (e.g., a low-absorbance particle phase with a value for absorbance of near-zero Au or zero Au). The second particulate phase is dispersed in the first particulate phase, i.e., the high-absorbance particulate phase, which increases the spacing between the particles of the first particulate phase. This spacing is occupied, at least in part, by particles of the second particulate phase with a lower absorbance (e.g., a low-absorbance particle phase with a value for absorbance of near-zero Au or zero Au), which provide a transmittance path for incident curative radiation. As a result, the particles of the second particulate phase act as a type of transmittance window for the incident curative radiation, which can penetrate further into the slurry. As a non-limiting example, the second particulate phase can include, alternatively can consist of, an organic particle that is transparent to curative radiation in the wavelength range of 300 nm to 700 nm. Suitable organic particles for the second particulate phase include polyamides, polylactide (PLA), poly ethylene glycol (PEG), and combinations thereof. A suitable concentration of the particles of the second particulate phase (e.g., a low-absorbance particle phase with a value for absorbance of near-zero Au or zero Au) is approximately 5 to 25 vol. %, alternatively 10 to 15 vol. %, and can vary based on morphology and size of the low- or non-absorbing particles. Furthermore, the higher end of the range of concentration is typically a balance between providing an increased penetration depth for curative radiation and an associated increase in porosity in the as-manufactured product, while the lower end of the range of concentration is dominated by a minimization of any effect on the penetration depth—in other words, too low a concentration effectively results in no effect on penetration depth. In these embodiments, it was found that a slurry with (i) 40 vol. % high-absorbance particulate phase consisting of uranium oxide having a particle diameter of 4 microns as a first particulate phase and (ii) 20 vol. % low- to non-absorbance particulate phase consisting of polyamide having a particle diameter of 9 microns as a second particulate phase had a penetration depth D2 to curative radiation of 405 nm of about 12 microns. As a comparison, the penetration depth D2 of a slurry with only one particulate phase composed of 40 vol. % particulate phase consisting of uranium oxide having a particle diameter of 4 microns had a penetration depth D2 to curative radiation of 405 nm of about 5 microns.

The size of the particle in the second particulate phase provides an increase in the penetration depth D2 and the printable depth D1, even for otherwise unprintable slurry compositions, i.e., slurry compositions with a printable depth of less than 9 microns under baseline conditions. This effect is additive. For example, even if a slurry composition of a first particulate phase can only be cured to a depth of 6 microns when used by itself without any addition of low- or non-absorbing particles, adding a second particulate phase of low- or non-absorbing particles with a particle size of 7 microns produces a transmittance window for curative radiation that allows the curative radiation to penetrate the slurry to a depth of 13 microns, i.e., [(first particulate phase cure depth)+(second particulate phase particle size (diameter))], which is sufficiently thick to allow printability. Although fully additive in theory, it is expected that some loses will reduce the penetration depth of the curative radiation to less than the sum [(first particulate phase cure depth)+(second particulate phase particle size (diameter))].

As used herein baseline conditions are a penetration depth of 1.5× the printable depth. For example, if printing 10 micron layers, the baseline condition is a penetration depth of 15 microns. If printing 30 micron layers, the baseline condition is a penetration depth of 45 microns. To achieve the 1.5× printable depth without use of transparent particles, one can reduce the vol. % loading of the ceramic phase and/or increase the average particle size. In one aspect, this can be achieved by removing fine particles, such particles having a dimeter less than 2 microns. As examples, $ZrO_2$ was used at a 55 vol. % loading of milled particles or 40 vol. % loading of nano powder and (i) a cure depth of between 30-50 microns and (ii) a print depth of 20-30 microns were observed with a 405 nm curative radiation. For $TiO_2$, 50 vol. % loading was used and (i) a cure depth of 21 microns and (ii) a print depth of 10-15 microns were observed with a 405 nm curative radiation. For black zirconia, 45 vol. % loading was used and (i) a cure depth of 16 microns and (ii) a print depth of 10 microns were observed with a 445 nm curative radiation. In these examples, the monomer mixture and doctor blade thickness were the same and the exposure conditions were 95% maximum power for 15 secs. The baseline condition has some amount of overexposure to help adhere the layers.

Example results indicate that the penetration depth D2 can be increased by inclusion of lower absorbance particles of a second particulate phase. In addition, the increase in penetration depth D2 is predictive based on the relationship:

Penetration depth (D2) = [(first particulate phase cure depth) +

(second particulate phase particel size (diameter)]

In some embodiments, a penetration depth can be double or triple the first particulate phase cure depth. Although additive in theory, it is expected that some loses will reduce the observed penetration depth to less than the theoretical penetration depth.

Figure 4:
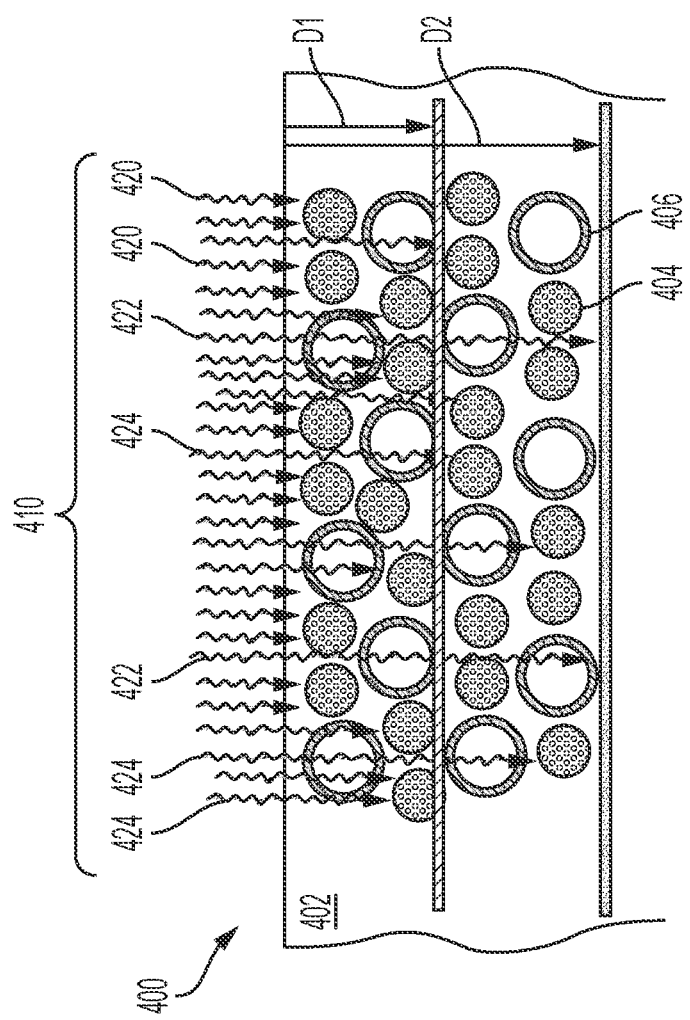
FIG. 4 schematically illustrates an embodiment in which the curative radiation penetration depth and the printable depth of the slurry are increased by adding a second particulate phase with a lower (or near-zero or zero) absorbance.

FIG. 4 schematically illustrates an embodiment in which the penetration depth D2 and the printable depth D1 of the slurry are increased by adding a second particulate phase with a lower absorbance (e.g., a low-absorbance particle phase with a value for absorbance of near-zero Au or zero Au). The FIG. 4 embodiment shows the curative radiation penetration into a slurry 400 with a first particulate phase 404 of uranium dioxide, a second particulate phase 406 of an organic polymer (which has a near-zero absorbance to a wavelength of 405 nm) in a monomer phase 402. The incident curative radiation 410 penetrates the monomer phase 402 of the slurry 400. Incident curative radiation 410 can interact with the monomer phase 402, or can interact with either the first particulate phase 404 of uranium dioxide or with the second particulate phase 406 of organic polymer. If the incident curative radiation 410 interacts with the first particulate phase 404 of uranium dioxide, then greater than 99% of the incident curative radiation 410 is absorbed and refraction and/or transmittance of incident radiation 410 is de minimis (less than 1%), as discussed above with reference to FIG. 2. However, if the incident curative radiation 410 interacts with the second particulate phase 406 of organic polymer, then the curative radiation 410 is transmitted through the second particulate phase 406. In some instances, the curative radiation 410 can be refracted by the second particulate phase 406 and, in other instances, combinations of these effects can occur, in which case, the curative radiation 410 can be transmitted and refracted one or more times (for each phenomenon) before being absorbed by the monomer phase 402 or by the second particulate phase 406. Examples of curative radiation 410 incident on the slurry 400 and undergoing absorption by the first particulate phase 404 of uranium dioxide or undergoing one or more transmissions and/or refractions as well as combinations of these phenomenon, are illustrated in FIG. 4 (see, e.g., incident curative radiation 420 absorbed by first particulate phase 404 of uranium dioxide, incident curative radiation 422 transmitted through the monomer phase 402 and the second particulate phase 406 to a penetration depth D2 and incident curative radiation 424 that is transmitted through the monomer phase 402 and the second particulate phase 406 and then is absorbed by first particulate phase 404 of uranium dioxide).

The efficiency of the transmittance windows in the second aspect discussed above may allow resins that are otherwise unprintable by themselves under baseline conditions to be printable. This technique effectively decouples the negative effect of particle light interactions on printability and allows one to manufacture (in an additive manufacturing process) any material to a green body state iteratively using 10 micron layers.

Finally, it is noted that addition of the second particulate phase is a less homogenous effect than is decreasing the loading of the particulate phase.

The techniques and approaches in the first aspect and the second aspect can be implemented singly or in combination.

As noted earlier herein, there are rheological aspects to including a second particulate phase with a lower (or near-zero or zero) absorbance in the liquid material. The addition of a secondary low molar absorptivity phase results in a change of the formulation rheology. According to the Kreiger-Dougherty equation, as the particle volume is increased (as is the case with adding transparent particles), the viscosity will increase. In addition, the shear thinning behavior may be less pronounced and the onset of shear thickening, defined by the critical shear stress, will be reduced to lower shear rates. As loading is increased and inter-particle spacing decreases the onset of shear thickening at low stresses is realized. As shear induced flow is used in the creation of a tape-casted thin film and the removal of excess resin and air bubbles when the build plate is zeroing to create a new layer, the critical shear stress needs to be increased above the shear stresses observed during the additive process to prevent build failures during additive manufacturing, e.g., printing. It should be noted that, in some embodiments, the viscosity is dynamic in that the viscosity starts very high as a zero shear viscosity and, as the solution is sheared, the viscosity decreases to what is called a Newtonian plateau. Also, a suitable viscosity can also be qualitatively evaluated based on the ability for the resin to be processed into a continuous thin film, e.g., by doctor blading, which provides insight into if the shear thinning phenomena is appropriate.

Generalized influences on critical shear stress to be considered in arriving at processing parameters include:
  as volume loading of particles ($\phi$) decreases, critical shear stress increases;
  as particle radius (a) decreases, critical shear stress increases (as $\alpha^{-(2\sim3)}$);
  as theoretical max packing factor ($\phi_m$) increases, critical shear stress increases;
  a broader particle size distribution for a fixed $\phi$ increases critical shear stress;
  as particle anisotropy and roughness decrease, critical shear stress increases;
  as fluid phase viscosity is reduced, critical shear stress increases;
  as repulsion forces increase (steric and electrostatic), critical shear stress increases; and
  as compatibility of steric dispersant and solvent increases, critical shear stress increases.

In specific embodiments, liquid material including SR494 as a monomer and a concentration of 40% uranium dioxide particles having a diameter of 4 microns had a process viscosity of 10,000 cP and exhibited a cure depth of 9 microns. When 9 micron particles of polyamide was used as the second particulate phase with a lower (or near-zero or zero) absorbance and were added to this example liquid material to a concentration of 15%, the viscosity of the liquid material increased and a cure depth of 18 microns could be achieved.

Using particles of polyamide or PEG as the second particulate phase has secondary beneficial effects during subsequent processing. While such particles are present during the curing of the liquid material and are, thereby, incorporated in to the body of structures formed by additive manufacturing processes using the liquid material, these particles can be subsequently removed from the green body prior to densification. Depending on composition of the second particulate phase, suitable removal processing can be applied prior to densification. For example, polyamide particles can be thermally decomposed to remove them from the body. When this thermal decomposition occurs at temperatures lower than that for densifying the polymer network, for example at least 20° C. lower, alternatively from ~100° C. to ~200° C. lower, then a residual network of interconnected microporosity is created. In another example, PEG particles can be dissolved through hydrolysis to remove them from the pre-densified body, which also creates a residual network of interconnected microporosity.

Other techniques can also suitably be used to remove the second particulate phase from the green body prior to densification. These include sonication and the use of solvent(s) that are selective to the second particulate phase without effecting the material of the green body. Additionally, combinations of these techniques can be used. For example, a combination of thermal decomposition and dissolution though hydrolysis or a combination of dissolution though hydrolysis and sonication. In each instance, whether used singly or in combination, the resulting network of interconnected microporosity provides a pathway for gases created in the subsequent densification process to egress the body and limits the risk of pressure-based cracking of the body from an internal build-up of such gases.

The network of interconnected microporosity also has secondary beneficial effects during nuclear operations. In particular, the network of interconnected microporosity created during pre-densification processing can be preserved through the densification process and remain present in the final product. In the final product, the network of interconnected microporosity provides a volume to contain fission gases generated during nuclear operations. The homogenous dispersion of the second particulate phase occurring in the liquid phase creation of the body during additive manufacturing is mirrored in the homogenous distribution of the microporosity in the final product. Varying the size of the organic particles used in the second particulate phase is another mechanism that can be used to influence the size of the microporosity.

In one example, the particles of the second particulate phase are plastic particles that have been formed from polymer derived ceramic uranium bearing resins that can increase viscosity, allow for light penetration, aid in debindering, and further, provide additional uranium stoichiometry for improved ceramic yields in fission reactor applications.

In another example, the particles of the second particulate phase are polymeric materials doped with cerium, yttrium, gadolinium, samarium, or other stabilizers. In one aspect, this embodiment enables organized dispersion of these stabilizers within the fuel form, and without loading the stabilizers directly as a powder into the ceramic slurry. Conventionally, loading stabilizers directly in the powder phase that will be used in the ceramic slurry often required significant powder mixing to ensure homogeneity of dispersion. However, loading the same stabilizers as a dopant into polymeric particles of the second particulate phase makes it easier to ensure that the stabilizers were evenly distributed without such mixing efforts.

Other aspects of this embodiment are applicable to nuclear thermal propulsion (NTP) applications. For example, stabilizers can be loaded into the plastic particles so that the stabilizers plate out in the resulting pores in the body manufactured by additive manufacturing, such as a fuel element structure. Iron is an example of a stabilizer that can be used in this way. At temperatures of 2200 K (or higher) when oxygen starts to disassociate from $UO_2$ in a highly reducing environment, uranium metal is formed. Under these conditions, the uranium metal migrates to the locations within the network of interconnected microporosity formed by the second particulate phase. Iron (or other stabilizer) loaded into the plastic particles is present within this network of interconnected microporosity as a remainder (after the second particulate phase has been removed from the green body as discussed above). When the uranium metal interacts with the iron within the pores, the iron forms a eutectic with the uranium metal. This iron-uranium eutectic is resistant to hydride formation during reactor cool down. However, if some uranium metal was unalloyed with the iron, then volume of the network of interconnected microporosity provides a volume for uranium hydride ($UH_3$) to form without cracking the overall $UO_2$ fuel element. Because the volume expansion of uranium hydride formation is the main failure mode of $UO_2$ NTP fuel elements, providing an expansion volume that mitigates crack formation can provide improved resistance to this failure mode of NTP fuel elements.

Not only can the polymeric particles of the second particulate phase be used to introduce secondary phases useful as stabilizers, more broadly polymeric particles could be used as a carrier for anything that can be trapped or doped in a transparent organic phase. As such, the polymeric particles can be vehicles to introduce a variety of materials into the green body and, subsequently, into the manufactured product.

The interconnected and tunable microporous network can also be used for capillary flow of liquid phase coolants in heat pipe reactor designs and in liquid metal cermets nuclear reactor designs. Microporosity enhances the wicking of certain heat pipe coolant liquids, such as water, NaK, liquid silver, etc. into the fuel element. Typical pore sizes is between 20-500 microns.

Examples of a slurry (such as a nuclear fuel slurry) for additive manufacturing have a composition comprising a monomer resin, uranium-containing particles, low- or non-absorbing particles (for the curative radiation used in the additive manufacturing process), a dispersant, a photoabsorber, a photoinitiator, and, optional, one or both of a diluent and a photoactivated dye.

The slurry (such as a nuclear fuel slurry) includes a monomer resin present in an amount of 25 vol. % to <45 vol. % (as a balance), alternatively 25 vol. % to <35 vol. % (as a balance), alternatively 25 vol. % to 30 vol. % (as a balance). In particular examples, the monomer resin is an acrylate-based monomer resin or a methacrylate-based monomer or mixtures thereof. In some embodiments, the monomer resin is at least 50% acrylate-based, alternatively 70 to 90% acrylate-based. In other embodiments, the acrylate-based monomer resin is functionalized, such as mono-functional, di-functional, tri-functional or tetra-functional or mixtures thereof. The acrylate-based monomer resin can be at least 50% di-functional, alternatively at least 80% di-functional, alternatively 70-90% di-functional. A particular example of a suitable acrylate-based monomer resin is hexane-diol di-acrylate (available under the brand name SR 238 from Sartomer (Arkema Group)). Another particular example of a suitable acrylate-based monomer resin is ethoxylated (4) pentaerythritol tetraacrylate (available under the brand name SR 494 from Sartomer (Arkema Group)). Alternatively, oligomer-based resins can be substituted for the acrylate-based monomer resins. Use of an oligomer-based resin can provide improvements over monomer resins in the areas of shrinkage control, rate of polymerization, and viscosity.

The slurry (such as a nuclear fuel slurry) contains particles of a uranium-containing material present in an amount of 30 vo.% to 40 vol. %, alternatively 32 vol. % or 34 vol. % or 36 vol. % up to 38 vol. % or 40 vol. %. Examples of uranium-containing material include uranium metal, uranium metal alloy, uranium ceramic, and uranium-molybdenum alloy. In some embodiments, the uranium-containing material represented by the surrogate particles is a uranium oxide, a uranium dioxide, a uranium carbide, a uranium oxycarbide, a uranium nitride, a uranium silicide, a uranium fluoride, a uranium chloride, a cermet of uranium oxide and tungsten, a cermet of uranium dioxide and tungsten, a cermet of uranium oxide and molybdenum, or a cermet of uranium dioxide and molybdenum. In other embodiments, the uranium-containing material can be represented by the chemical formula U(C,O,N,Si,F,Cl), where any one or more of carbon (C), oxygen (O), nitrogen (N), silicon (Si), fluorine (F), chlorine (Cl) and combinations thereof may be present, both stoichiometrically and non-stoichiometrically, with the uranium.

Other non-limiting examples of uranium-containing material include inorganic species such as U(OH, B, Sb, P, As, S, Se, Te, Cl, Br, I); uranium hydroxides and hydrates; uranium bromide; uranium iodide; uranium selenides; uranium tellurides; uranium chloride; uranium sulfides; uranium borides; uranium phosphides; uranium arsenide and antimonide. Organic ligand/anionic species may also be used as the uranium-containing material. However, as the size of these polyatomic ions increases, there will be a limit above which the decreasing concentration of uranium mass is no longer favorable for manufacturing into structures for nuclear fuel related applications. Non-limiting examples of uranium-containing material include organic ligand/anionic species such as ammonium urinates; uranium carbonyl; uranyl nitrate; uranyl oxalate; uranyl peroxide; uranyl acetate; uranyl benzoate; uranyl tannate; and uranyl quinolinate.

Further, the uranium-containing material may be additively manufactured in one form and subsequently converted to another uranium form, such as by oxidation, reduction, carburization, nitriding in a post-sintering process step. For example, uranium from the uranium-containing material formed during additive manufacturing can be converted to uranium oxide through an oxidation process.

The slurry (such as a nuclear fuel slurry) includes a dispersant present in an amount of >0 vol. % to 7 vol. %, alternatively 1 vol. % to 5 vol. %, alternatively 4 vol. % to 6 vol. %. The particular dispersant is selected for its ability to disperse in the slurry composition and the particle of uranium-containing material. The amount of dispersant should be at least sufficient to fully coat the particles and sufficient to produce a well dispersed shear thinning non-Newtonian fluid and not be thixotropic. In one example, the slurry has a viscosity of less than or equal to 100000 centipoise (cP), alternatively less than or equal to 10000 cP. Too high of a zero shear viscosity or the lack of a shear thinning behavior (thixotropic or shear thickening) limits successful, defect free, manufacturing.

In particular examples, the dispersant has a composition including a quaternary ammonium chloride, such as VARIQUAT® CC-9 or VARIQUAT® CC-42, both available from Evonik Industries AG, Germany, or is a high molecular weight polymeric dispersant, such is TEGO® Dispers 660 C or TEGO® Dispers 670, both available from Evonik Industries AG, Germany. In a further particular example, two different dispersants or a mixture of dispersants can be used. For example, a dispersant of a first composition and a dispersant of a second composition can be mixed a ratio of the first component to the second component (first component:second component) ranging from 2 to 2.5, alternatively from 2.15 to 2.35.

The photoabsorber absorbs the incident radiation within certain wavelengths and stops or reduces the free-radicalization polymerization of the slurry resulting from those wavelengths and thereby reduces cross-linking. In particular examples, the photoabsorber is a triazine-based photoabsorber, preferably 2-hydroxyphenyl-s-triazine with 18-20% 2-methoxy-1-propyl-acetate (such as Tinuven® 477, available from BASF, and which is a liquid triazine-based photoabsorber based on a red shifted tris-resorcinol-triazine chromophore that exhibits high thermal stability, excellent photo-permanence and minimal interaction with metal catalysts and amine crosslinkers).

The photoinitiator is selected to match the incident radiation used to cure the slurry composition (i.e., the curative radiation), or vice versa. In particular examples, the photoinitiator is a Type I or Type II photoinitiator, preferably Bis(2,4,6-trimethylbenzoyl)-phenylphosphineoxide, such as OmniRad 819 (former Irgacure 819) available from IGM Resins, USA, and which is a photoinitiator for radical polymerization of unsaturated resins upon exposure to curative radiation.

The slurry (such as a nuclear fuel slurry) optionally includes a diluent. The diluent is typically used for its effect on the monomer phase and is added or adjusted for its influence on the as-manufactured part in the debindering process. For example, when the diluent is driven-off in debindering, small voids remain in the as-manufactured part and, in components for a nuclear reactor, the small voids provide an outgassing volume, which contributes to minimize or prevent cracking of the components. When present, the diluent is present in an amount of 4 vol. % to 40 vol. % as a balance, alternatively 4 vol. % to 20 vol. % as a balance, alternatively 4 vol. % to 6 vol. % as a balance, alternatively 8 vol. % to 40 vol. % or 10 vol. % to 30 vol. % as a balance, alternatively 8 vol. % to 20 vol. % as a balance or 8 vol. % to 15 vol. % as a balance. Suitable diluents are liquid at room temperature and have a sufficiently low boiling point that the diluent can be driven-off at temperatures below 400° C., alternatively below 300° C. In particular examples, the diluent is methylnaphthalene.

The slurry (such as a nuclear fuel slurry) optionally includes a photoactivated dye. When present, the photoactivated dye is present in an amount of greater than 0 vol. %, alternatively 0.05 vol. % to 0.10 vol. %. The photoactivated dye provides visualization of the cured layer by changing the color upon curing. Such visualization can be detected under certain wavelengths, such as UV light, and can be used for fault detection or other inspection purposes. In particular examples, the photoactivated dye is a triarylmethane dye, preferably $C_{25}H_{30}ClN_3$ (available under the brand name Crystal violet from Sigma-Aldrich Corp., USA). Crystal violet is a blue, aniline-derived dye. In other particular examples, the photoactivated dye is present in an amount of 0.002 mol/liter of monomer resin.

In certain embodiments, the photoabsorber, photoinitiator, and photoactivated dye (when present) are selected to be effective with the radiation photosource, for example, the photoabsorber, photoinitiator, and photoactivated dye are selected to be effective between 300 nm and 700 nm, alternatively 400 nm to 620 nm or 400 nm to 560 nm.

The disclosed nuclear fuel slurries can be used in methods of additive manufacturing. Suitable additive manufacturing equipment can be utilized that can accommodate the specific requirements for the materials to be used in the manufacture of the component (such as chemical resistance), the specific requirements for utilization of the equipment itself (such as specific atmospheric or vacuum requirements), as well as can accommodate the size and geometry of the manufactured component.

Examples of suitable additive manufacturing equipment include SLA and DLP machines, electron-beam-based additive manufacturing equipment, and DLP stereolithographic equipment, any one of which can be modified or adapted for specific requirements.

The liquid materials and slurries disclosed herein and the incorporation of a second particulate phase with a lower (or near-zero or zero) absorbance can be adapted for use in any suitable additive manufacturing process. Examples of suitable additive manufacturing processes are disclosed in ISO/ASTM52900-15, which defines categories of additive manufacturing processes, including: binder jetting, directed energy deposition, material extrusion, material jetting, powder bed fusion, sheet lamination, and photopolymerization. The contents of ISO/ASTM52900-15 are incorporated herein by reference. Stereolithography is a form of additive manufacturing using photopolymerization processes. In example embodiments, stereolithographic additive manufacturing techniques include photoinitiation from exposure to ultraviolet radiation or beta radiation. In some example embodiments, the ultraviolet radiation is generated in a digital light processor (DLP) or in a stereolithography apparatus (SLA). In other example embodiments, the beta radiation is generated in electron-beam (EBeam) equipment or electron irradiation (EBI) equipment. Although the methods and compositions disclosed herein are described within the context of stereolithography, it is expressly contemplated that such methods and compositions can be extended to and or adapted to other additive manufacturing processes.

Example methods of additive manufacturing can comprise providing a design of a component to be manufactured to a controller of an additive manufacturing equipment. Such a design can be incorporated into an additive manufacturing protocol. In an example method, a supply volume of the nuclear fuel slurry composition is established, such as a bath or reservoir. A base portion of a green body of the component is then formed by curing a portion of the slurry composition that is in contact with a movable base of the additive manufacturing equipment. Alternatively, a base portion can be pre-fabricated prior to the initiation of the additive manufacturing process. Additional portions of the green body of the component are formed on a layer-by-layer basis by, first, curing a portion of the slurry composition that is in contact with the base portion to form a first layer of a green body and then, second, curing a portion of the slurry composition that is in contact with the prior deposition layer of the green body to form the additional portions while translating the movable base relative to an interface between a surface of the supply volume and the most recently formed additional portion of the green body. The translation of the movable base is typically in accordance with the design of the component and as directed by the additive manufacturing protocol. In example embodiments, translating the movable base relative to the interface between the surface of the supply volume and the most recently formed additional portion of the green body has an X-axis resolution and a Y-axis resolution of 50 microns or better and has a Z-axis resolution of 20 microns or better. In example embodiments, each additional portion of the green body of the component formed on the layer-by-layer basis has a thickness of at least 10 microns, alternatively 25 microns to 50 microns. Once the layer-by-layer manufacture of the green body of the component is complete, the green body of the component can be removed from the additive manufacturing equipment and sintered (or processed by other debindering/consolidating techniques) to form a densified ceramic.

Subsequently, the manufactured green body can be sintered to form the manufactured component, such as a manufactured component of the nuclear reactor system. Other suitable forms of consolidation can be used to form the manufactured component, including combinations of temperature, pressure, and atmosphere. The consolidated manufactured component can be further processed by, for example, one or more of machining, grinding, polishing, coating, carburizing, nitriding, oxidizing, and etching.

Figure 5:
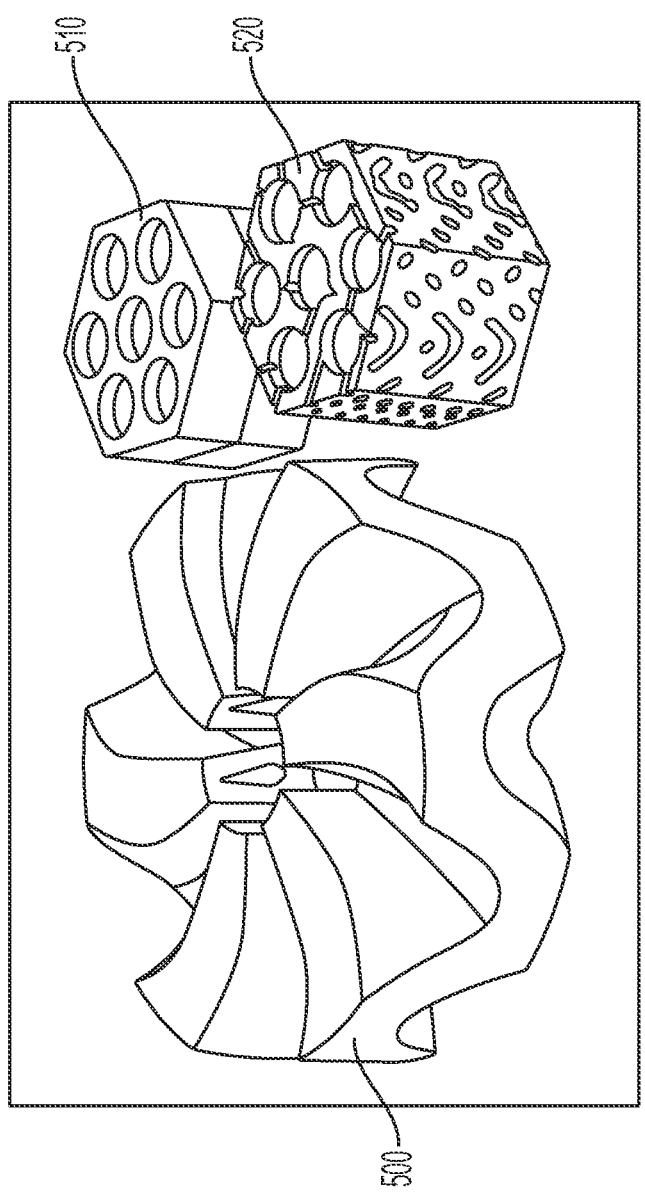
FIGS. 5 and 6 illustrate example manufactured green bodies manufactured consistent with slurry compositions and additive manufacturing processes disclosed herein.
Figure 6:
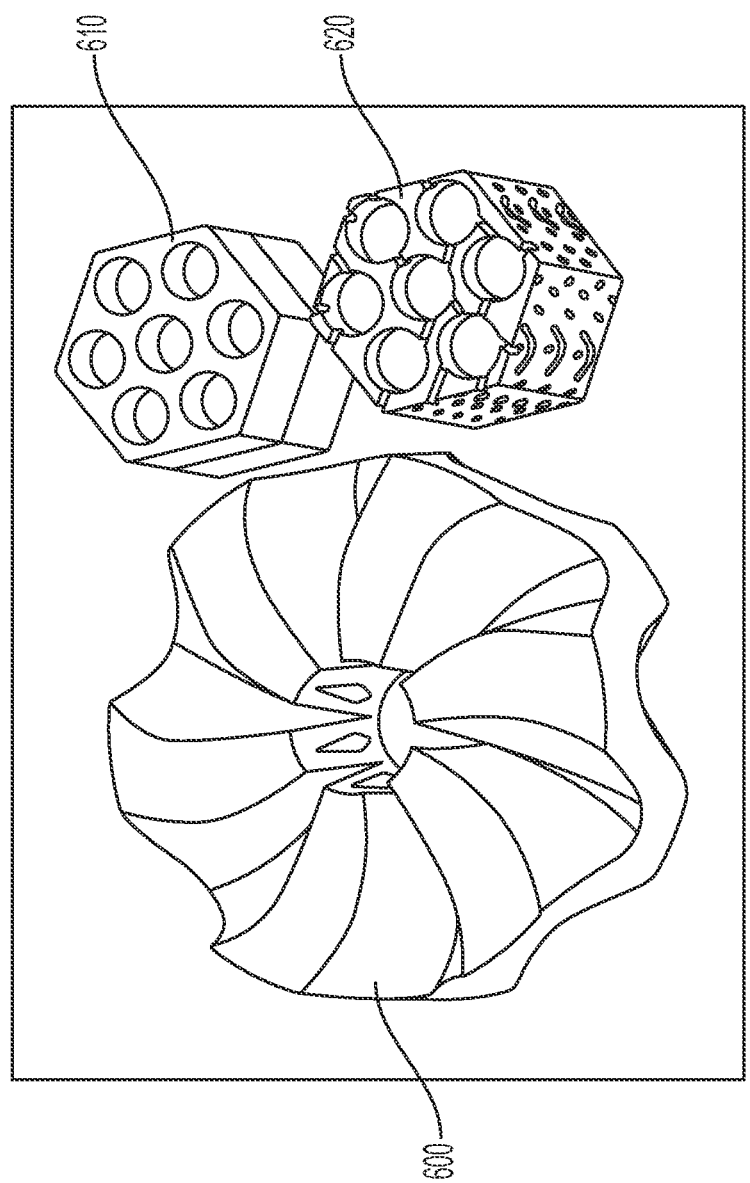

Finally, FIGS. 5 and 6 illustrate, from two different angles, green bodies 500, 510, 520 manufactured using an acrylate-based slurry composition. The acrylate-based slurry composition is set forth in the following Table 1, and used a separate diluent component, i.e., poly ethylene glycol or PRO14388 (a SR238 monomer/PEG-like diluent blend commercially available from Sartomer).

TABLE 1

| SLURRY COMPOSITION | | |
| --- | --- | --- |
| Slurry Component | Slurry Composition | |
| Monomer Resin | SR 238 (Hexane Diol Di-acrylate) | 26 vol. % |
| | SR 494 (Ethoxylated Pentaerythritol tetraacrylate) | 21 vol. % |
| Particle of Uranium-containing Material | $UO_2$ (4 micron diameter) | 40 vol. % |
| Low-Absorbance Particle | Polyamide (9 micron diameter) | 15-20 vol. % |
| Dispersant | CC42 (Polypropoxy Quaternary ammonium chloride) | 0.8 vol. % |
| Photoactivated Dye | — | — |
| Photoabsorber | — | — |
| Photoinitiator | O819 (Bis(2,4,6-trimethylbenzoyl)-phenylphosphineoxide) | 0.2 vol. % |
| Diluent | PRO14388 | 14 vol. % |

The acrylate-based slurry composition was used in an additive manufacturing process as disclosed herein, in particular using a digital light processor (DLP). The shown green body is in the form of a test structure, but could be formed as any structure by using a suitable additive manufacturing protocol.

EXPERIMENTAL TESTING A: Evaluation of a heterogeneous particle strategy was performed utilizing both inorganic particles (Table 2) and organic particles (Table 3) with low absorption in the tested wavelength regime (405 nm). A SR238 based monomer formulation was used for each of the samples in Table 2. This basic formulation was used to remove the effects of advanced multi-monomer formulation and to focus solely on the effect of transparent particle addition, i.e., second particulate phase material. Also, a SR238 based monomer formulation was used because the low base viscosity of SR238 allows for the highest possible particle loading when compared to mixed monomer formulations that have a higher base viscosity. Table 2 shows the change in cure depth (microns) as a function of low-absorbance particle and uranium particle loading (vol. %) for Samples A to L. This was performed with both organic and inorganic transparent phases using the monomer formulations disclosed in Table 3

TABLE 2

CURE DEPTH FOR VARIOUS FORMULATIONS

| Sample | Uranium Particle Loading (Vol. %) | Low-Absorbance Particle Loading (Vol. %) | Low-Absorbance Particle Material | Cure Depth (microns) |
|---|---|---|---|---|
| A | 0.25 | 0.0 | N/A | 10 |
| B | 0.25 | 0.1 | Orgasol 2001 EXD | 12 |
| C | 0.25 | 0.2 | Orgasol 2001 EXD | 27 |
| D | 0.25 | 0.25 | $Al_2O_3$ | 18 |
| E | 0.25 | 0.3 | Orgasol 2001 EXD | 38 |
| F | 0.4 | 0 | N/A | 5 |
| G | 0.4 | 0.1 | Orgasol 2001 EXD | 9 |
| H | 0.4 | 0.2 | Orgasol 2001 EXD | 12 |
| I | 0.4 | 0.3 | Orgasol 2001 EXD | 25 |
| J | 0.5 | 0 | N/A | 5 |
| K | 0.5 | 0.1 | Orgasol 2001 EXD | 8 |
| L | 0.5 | 0.15 | Orgasol 2001 EXD | 13 |

TABLE 3

FORMULATIONS

| Slurry Component | Slurry Composition | |
|---|---|---|
| Monomer Resin | SR 238 (Hexane Diol Di-acrylate) | Varied (75-30 vol. %) |
| Particle of Uranium-containing Material | $UO_2$ | Varied (25-50 vol. %) |
| Low-Absorbance Particle | Orgasol 2001 EXD | Varied (10-30 vol. %) |
| Dispersant | CC42 (Polypropoxy Quaternary ammonium chloride) | Varied (4 vol. % of Powder) |
| Photoinitiator | O819 (Bis(2,4,6-trimethylbenzoyl)-phenylphosphineoxide) | 0.025 mol/L Monomer |

The monomer formulations in Table 3 were used to assess penetration depth as a function of low-absorbance particle loading. As the powder (uranium-containing or low-absorbance) concentration increased in the formulations, the relative volume of monomer resin and dispersant changed. Therefore, in Table 3, dispersant is reported in relative terms to powder, and photoinitiator is reported in relative terms to monomer resin.

Figure 7:
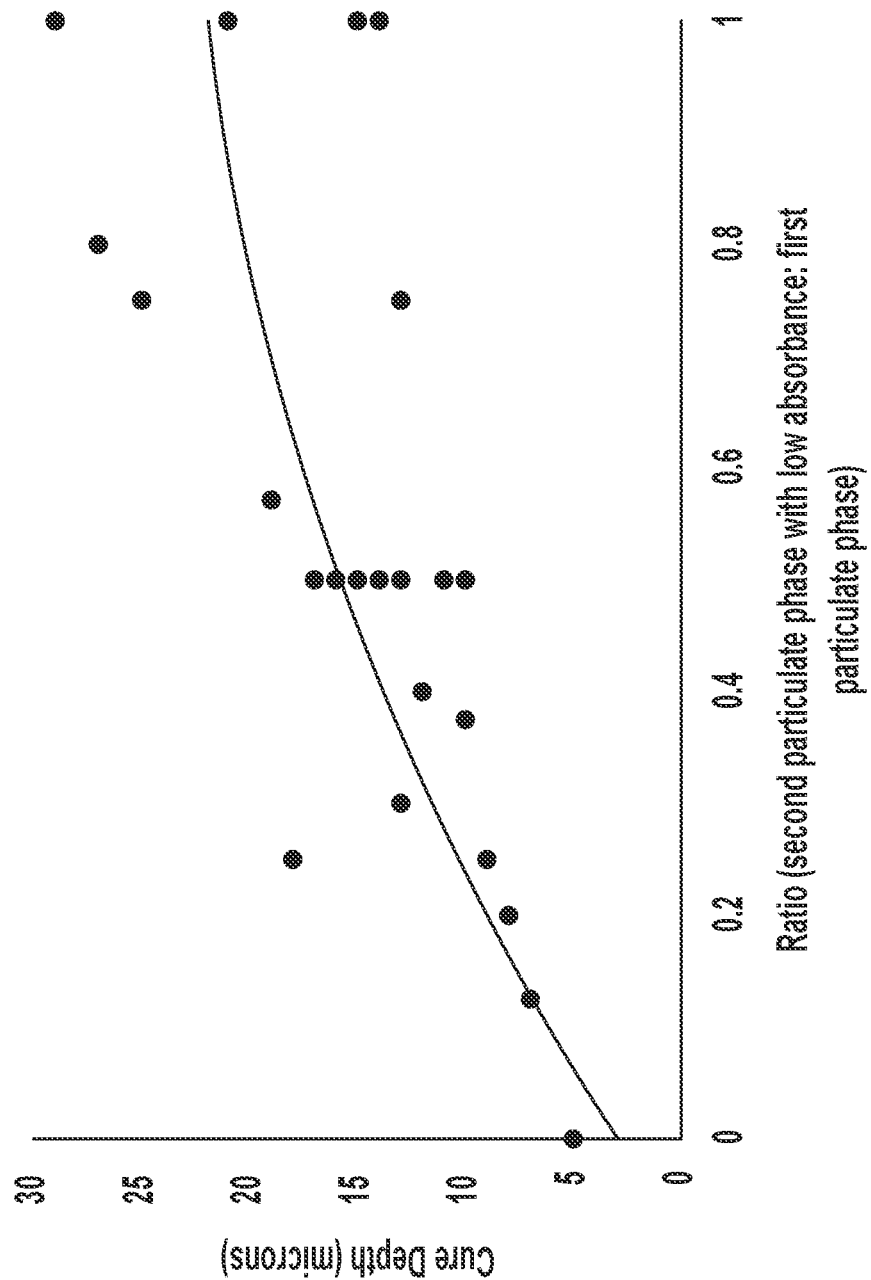
FIG. 7 is a graph showing results for cure depth (microns) as a function of the ratio of (second particulate phase with low absorbance):(first particulate phase) for example samples.

Formulations from Table 3 at the vol. % and material as reported in Table 2 were exposed to curative radiation of 405 nm at 174 mW/$cm_2$ for 15 secs and the depth into the slurry volume at which curing occurred (the "Cure Depth") was measured. Curative radiation exposure occurred with the 3D printer and the Penetration Depth was measured with a micrometer. Table 2 contains the experimentally measured cure depth results for several samples and FIG. 7 shows results for cure depth (microns) as a function of the ratio of (second particulate phase with low absorbance):(first particulate phase) for a larger set of samples. As seen in FIG. 7, cure depth increases as the ratio of transparent plastic particles:uranium particles is increased. These data points are for different monomers, photo-initiating systems, and volumetric loading of uranium, but have been normalized to ratio of transparent plastic particles:uranium particles. When so normalized, there is a clear trend of increasing depth with increasing transparent particles. In other words, across a range of formulations, uranium particle loading, and photo-initiating systems, FIG. 7 demonstrates that increasing loading of second particulate phase with low absorbance (vol. %) generally leads to increased cure depth (microns). The effect appears linear at ratios up to about 0.25, but is asymptotic for ratios from about 0.25 to 1.0, with a cure depth limit of about 22 microns at a ratio of 1.0. This asymptotic maximum is reflective of a regime in which the effect from plastic particles dominates the effect from uranium particles.

EXPERIMENTAL TESTING B: In some embodiments, the polymeric material for the particles of the second particulate phase is replaced by a non-polymeric material that has a lower (relative to the uranium containing particle) or near-zero or zero absorbance. For example, alumina ($Al_2O_3$) can be used as the particle of the second particulate phase. Alumina is a viable material for the particles of the second particulate phase because alumina is fairly transparent to curative radiation (with an absorbance <0.25 Au) and has a low refractive index (approx. 1.8 @ 400 nm). In exemplary embodiments, the alumina particles have a diameter of 3 microns to 12 microns, alternatively, 6 microns to 10 microns, alternatively 8 microns to 10 microns.

To experimentally explore this embodiment, two slurries were prepared using alumina at 1200 grit (approximately 3 microns in diameter). The slurries were based on the slurry composition shown in Table 1, with the following modifications: Slurry A contained 25% uranium dioxide with a balance of SR238/SR494 and did not contain any alumina and Slurry B contained 25% uranium dioxide with a balance of SR238/SR494 and 25% alumina. The slurries were then identically mixed and investigated for the penetration depth of curative radiation at 405 nm at 174 mW/$cm^2$ for 15 secs. This penetration depth testing was conducted using the same procedures as reported in connection with the slurries and results reported in association with Tables 2-3 and FIG. 7. In this example, it was determined that Slurry A had a penetration depth of 13 microns and Slurry B had a penetration depth of 18 microns. These results for penetration depth demonstrate the efficacy of the use of a second particulate phase containing particles with a lower (or near-zero or zero)

absorbance (as compared to uranium dioxide) to increase the penetration depth of the curative radiation.

Although described in connection with additive manufacturing components of a nuclear reactor, particularly fuel element related components, the liquid materials, slurries and additive manufacturing methods disclosed herein can be applied to the manufacture of other components of fission reactors, such as cladding, and can be applies to manufacture of other technologies, including in the petro-chemical industries (for example, for chemical reaction vessels), in the aerospace industry (for example, for parts of turbines including turbine blades and housings, and for parts for missiles and rockets including combustion chambers, nozzles, valves, and coolant piping) as well as can be adapted to other complex articles of manufacture. Additionally, although described in relation to fissionable fuel materials, nuclear reactors, and associated components, the principles, compositions, structures, features, arrangements and processes described herein can also apply to other materials, other compositions, other structures, other features, other arrangements and other processes as well as to their manufacture and to other reactor types.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to,"

"related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:

1. A slurry for additive manufacturing having a composition comprising (in vol. % relative to total volume of the slurry):

| | |
|---|---|
| a plurality of first particles | 30 vol. % to 40 vol. %; |
| a plurality of second particles | 10 vol. % to 20 vol. %; |
| a dispersant | >0 vol. % to 5 vol. %; |
| a photoabsorber | greater than 0 vol. %; |
| a photoinitiator | greater than 0 vol. %; and |
| at least one monomer resin | 25 vol. % to <45 vol. % as a balance, | wherein a total amount of plurality of first particles and plurality of second particles is maximum 60 vol. %,
wherein the first particles have a composition including a uranium-containing material,
wherein the second particles have an absorbance for wavelengths of 300 nm to 700 nm that is equal to or greater than 0 Au and is less 1.0 Au,
wherein the photoabsorber, and photoinitiator operate within an incident wavelength of 300 nm to 700 nm.

2. The slurry for additive manufacturing according to claim 1, wherein the second particles have an absorbance for wavelengths of 300 nm to 700 nm equal to or greater than 0.001 Au and equal to or less than 0.7 Au or equal to or greater than 0.01 Au and equal to or less than 0.5 Au.

3. The slurry for additive manufacturing according to claim 1, wherein the second particles have an absorbance for wavelengths of 300 nm to 700 nm equal to or greater than 0.001 Au to equal to or less than 0.26 Au.

4. The slurry for additive manufacturing according to claim 1, wherein the second particles have a composition comprising polyamide or poly ethylene glycol.

5. The slurry for additive manufacturing according to claim 1, wherein the second particles have a composition further comprising a neutron absorber in an amount of 2 vol. % to 5 vol. %, wherein the neutron absorber has a neutron absorption cross-section of at least 60,000 barns.

6. The slurry for additive manufacturing according to claim 5, wherein the neutron absorber has a composition that includes at least one element selected from the group consisting of cerium, yttrium, gadolinium, xenon and samarium.

7. The slurry for additive manufacturing according to claim 5, wherein the second particles have a composition further comprising a localized stabilizer in an amount of 2 vol. % to 5 vol. %.

8. The slurry for additive manufacturing according to claim 7, wherein the localized stabilizer has a composition that includes iron.

9. The slurry for additive manufacturing according to claim 1, wherein the uranium-containing material is a uranium metal, a uranium metal alloy, a uranium ceramic, or a uranium-molybdenum alloy.

10. The slurry for additive manufacturing according to claim 1, wherein the uranium-containing material is a uranium oxide, a uranium dioxide, a uranium carbide, a uranium oxycarbide, a uranium nitride, a uranium silicide, a uranium fluoride, a uranium chloride, a cermet of uranium oxide and tungsten, a cermet of uranium dioxide and tungsten, a cermet of uranium oxide and molybdenum, or a cermet of uranium dioxide and molybdenum.

11. The slurry for additive manufacturing according to claim 10, wherein the uranium-containing material is a uranium oxide or a uranium dioxide or a uranium trioxide.

12. The slurry for additive manufacturing according to claim 1, wherein the uranium-containing material is U(C, O,N,Si,F,Cl).

13. The slurry for additive manufacturing according to claim 1, wherein the plurality of first particles has a D50 particle size of 40 nm to 10 μm.

14. The slurry for additive manufacturing according to claim 1, wherein the monomer resin is an acrylate-based monomer resin or a methacrylate-based monomer or mixtures thereof.

15. The slurry for additive manufacturing according to claim 14, wherein the monomer resin is at least 50% acrylate-based.

16. The slurry for additive manufacturing according to claim 14, wherein the monomer resin is 70 to 90% acrylate-based.

17. The slurry for additive manufacturing according to claim 14, wherein the acrylate-based monomer resin is mono-functional, di-functional, tri-functional or tetra-functional or mixture thereof.

18. The slurry for additive manufacturing according to claim 17, wherein the acrylate-based monomer resin is at least 50% di-functional.

19. The slurry for additive manufacturing according to claim 18, wherein the acrylate-based monomer resin is at least 80% di-functional.

20. The slurry for additive manufacturing according to claim 18, wherein the acrylate-based monomer resin is 70-90% di-functional.

21. The slurry for additive manufacturing according to claim 1, wherein the composition further comprises a diluent in an amount of >0 vol. % to 15 vol. %.

22. The slurry for additive manufacturing according to claim 21, wherein the diluent has a refractive index that is equal to or higher than a refractive index of the monomer resin.

23. The slurry for additive manufacturing according to claim 21, wherein the diluent is inert.

24. The slurry for additive manufacturing according to claim 21, wherein the diluent is methylnaphthalene.

25. The slurry for additive manufacturing according to claim 21, wherein the composition is curable by photoinitiation or EBeam radiation.

* * * * *